US011305200B2

(12) United States Patent
Blazek et al.

(10) Patent No.: US 11,305,200 B2
(45) Date of Patent: Apr. 19, 2022

(54) COMPUTER DEVICE CONFIGURED TO PROVIDE A COMPUTER IMPLEMENTED GAME AND METHOD

(71) Applicant: KING.COM LIMITED, St. Julians (MT)

(72) Inventors: Brent Blazek, Stockholm (SE); Marwan Zitouni, Stockholm (SE); Nishant Shah, Stockholm (SE)

(73) Assignee: KING.COM LIMITED, St. Julians (MT)

( * ) Notice: Subject to any disclaimer, the term of this patent is extended or adjusted under 35 U.S.C. 154(b) by 37 days.

(21) Appl. No.: 16/859,269

(22) Filed: Apr. 27, 2020

(65) Prior Publication Data
US 2021/0331080 A1 Oct. 28, 2021

(51) Int. Cl.
A63F 13/85 (2014.01)
A63F 13/69 (2014.01)
A63F 9/06 (2006.01)
A63F 13/44 (2014.01)

(52) U.S. Cl.
CPC .......... A63F 13/85 (2014.09); A63F 9/0612 (2013.01); A63F 13/44 (2014.09); A63F 13/69 (2014.09); A63F 2300/609 (2013.01)

(58) Field of Classification Search
CPC .......... A63F 13/85; A63F 13/69; A63F 13/44; A63F 9/0612; A63F 2300/609
See application file for complete search history.

(56) References Cited

U.S. PATENT DOCUMENTS

| | | | | |
|---|---|---|---|---|
| 2006/0040730 | A1* | 2/2006 | Walker | G07F 17/32 463/20 |
| 2007/0232384 | A1* | 10/2007 | Pace | G07F 17/32 463/25 |
| 2011/0045892 | A1* | 2/2011 | Vann | G07F 17/34 463/20 |
| 2014/0357345 | A1* | 12/2014 | Santini | A63F 13/61 463/25 |

* cited by examiner

Primary Examiner — Kevin Y Kim
(74) Attorney, Agent, or Firm — Saul Ewing Arnstein & Lehr LLP

(57) ABSTRACT

A computer device is configured to provide a computer implemented game. The computer device has at least one processor which is configured to determine a number of booster options that have been activated, a booster option being usable in the computer implemented game to provide a respective additional effect. The at least one processor is further configured to determining if the determined number of booster options is greater than a threshold number and when the determined number of booster options is greater than the threshold number, determine that a further booster option is to be provided in the computer implemented game.

17 Claims, 13 Drawing Sheets

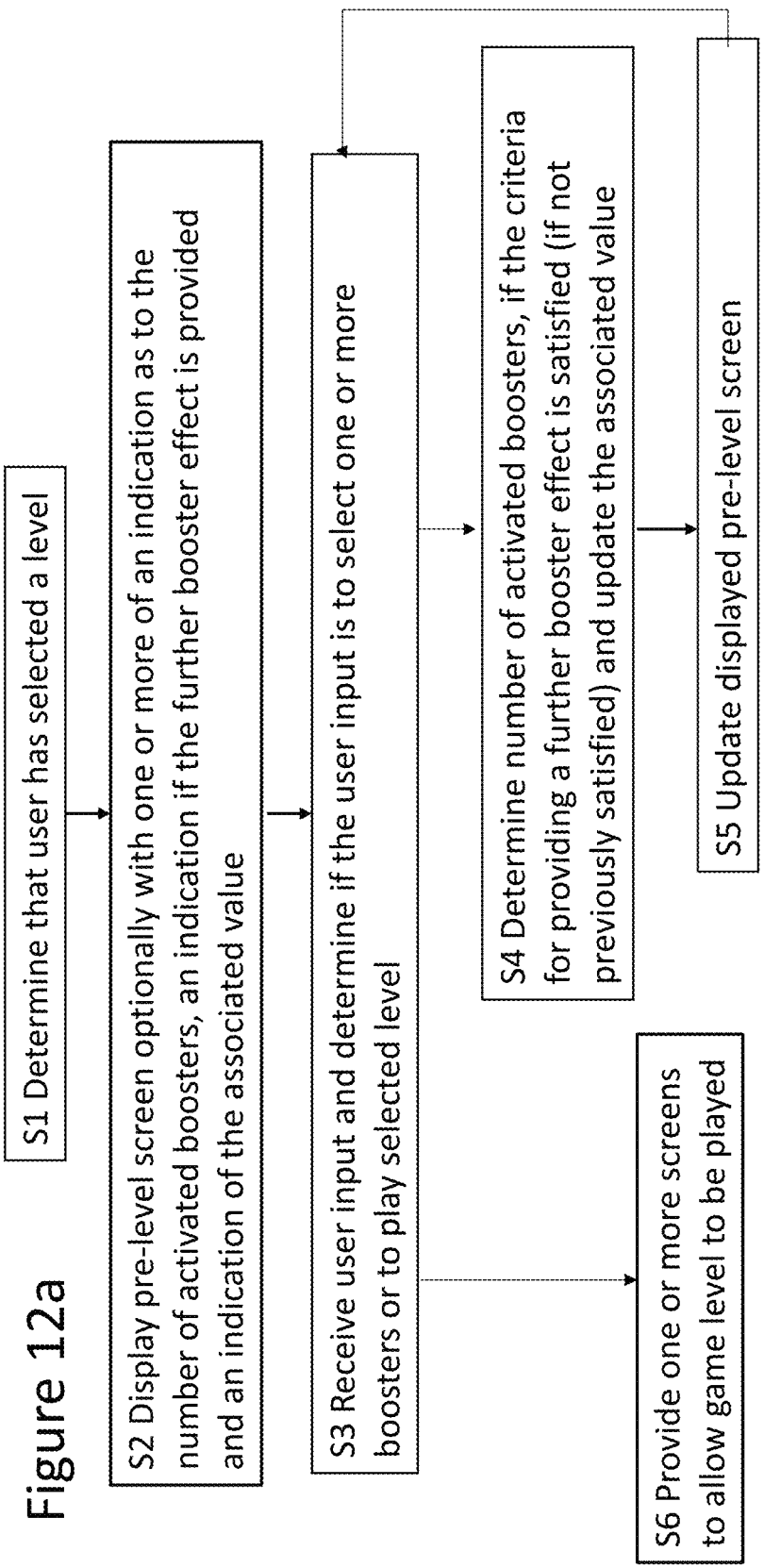

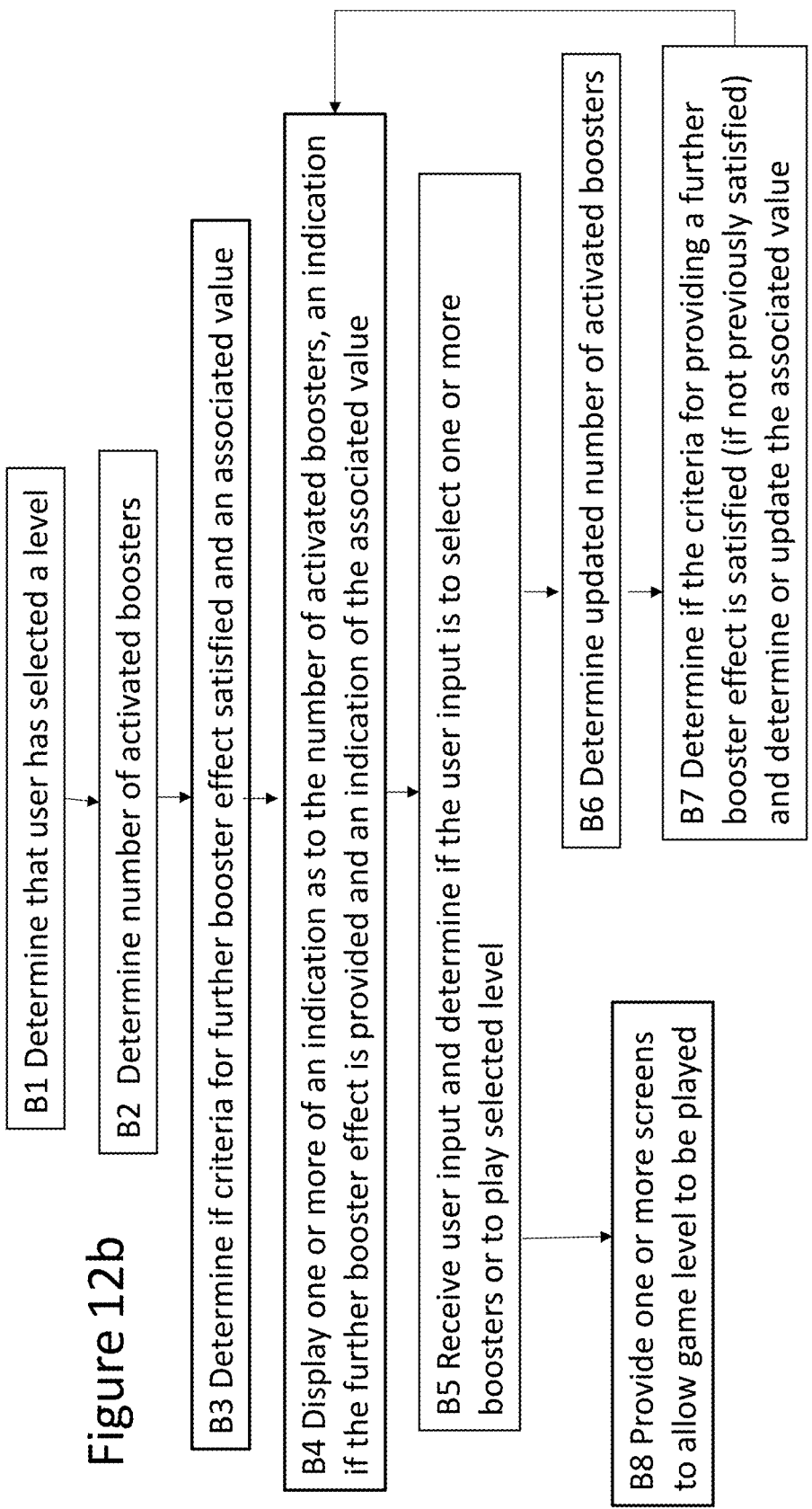

COMPUTER DEVICE CONFIGURED TO PROVIDE A COMPUTER IMPLEMENTED GAME AND METHOD

FIELD OF THE INVENTION

Embodiments of this application relate to a user device for use in playing a computer implemented game.

Some embodiments may relate to engaging users or players in a computer game executable in an online environment.

The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how, for example, the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear.

An existing type of match-three game is a so-called "switcher" game. In a switcher game, the player switches place onto adjacent game elements on the game board so that one or both of them create a chain of at least three adjacent game elements of the same type. Those matched game elements will then disappear. The game board is then repopulated with game objects.

One such known match three-type switcher game is known by the trade mark Candy Crush Saga. In that game, the game board is repopulated with game elements, for example, falling downwards onto the game board from the top edge of the screen from which the game is played.

Another known type of game is "linker game", where a sequence of game elements are linked to form a known sequence.

Another example is the so called 'clicker' games where the player can click on a group of adjacent game elements of a certain type and those will then be removed. Some clicker games only require two adjacent elements to remove those elements if clicked by the user. Others may require more than two. To play the game, the user will, via a user interface, click on any group of two or more touching blocks satisfying a criteria. New blocks may or may not appear on the game board. The remaining game element blocks drop down and slide left to fill gaps on the game board.

Another type of match game is the so called 'shooter' games where the player launches for example a ball or bubble on to the game board trying to aim at groups of similar game elements already on the game board. If the launched ball hits or forms a group of more than 3 similar game elements, then that group of game elements are removed from the game board.

This patent specification describes not only various ideas and functions, but also their creative expression. A portion of the disclosure of this patent document therefore contains material to which a claim for copyright is made and notice is hereby given: Copyright King.com Limited 2020 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device configured to provide a computer implemented game, the computer device comprising: a display: a user interface configured to receive user input from a player of the computer implemented game; and at least one processor, the at least one processor being configured to: determine a number of booster options that have been activated, a booster option being usable in the computer implemented game to provide a respective additional effect; determining if the determined number of booster options is greater than a threshold number; and when the determined number of booster options is greater than the threshold number, determining that a further booster option is to be provided in the computer implemented game.

The further booster option may be different from the activated booster options.

The at least one processor may be configured to determine a value of the at least one further booster option in dependence on the determined number of booster options.

The further booster option may comprise providing a defined time period in the computer implemented game during which a user is permitted to make as many game moves as the user is able to make in that defined time period.

A maximum number of available moves may be associated with the computer implemented game, the maximum number of available moves being in addition to the game moves that the user is permitted to make in the defined time period.

The defined time period may be dependent on the determined number of boosters.

The at least one processor may be configured to cause the display to display one or more user selectable options, a user selectable option being associated with a respective booster option, determine in response to user input received via the user interface when a respective user selectable option has been selected and determine that the respective booster option associated with the respective user selectable option has been activated.

The at least one processor may be configured, in response to one or more game criteria being satisfied, to determine that a respective booster option is activated.

The at least one processor may be configured, in response to a purchase, to determine that a respective booster option is activated.

The at least one processor may be configured to deploy the further booster option in the computer implemented game in response to user input received via the user interface, the user input allowing a user to control when the further booster option is deployed in the computer implemented game.

The at least one processor may be configured to cause the display to display a game board for the computer implemented game and to display a user selectable option for the further booster option, and in response to user input selecting the user selectable option for the further booster option causing the further booster option to be deployed in the computer implemented game.

The at least one processor may be configured to cause the display a user selectable play option, the at least one processor configured to cause a game board for the computer implemented game to be displayed in response to user input selecting the user selectable play option.

The at least one processor may be configured to control the display to display a plurality of different user selectable level options for the computer implemented game and in response to user input selecting one of the user selectable level options, cause an associated level of the computer implemented game to be provided.

The at least one processor may be configured to cause the display to display a pre-level screen after a respective user selectable level option has been selected, the pre-level screen configured to display information associated with at least one of the booster options.

According to another aspect, there is provided a computer implemented method, the method being performed in a computing device comprising at least one processor, at least one memory, a display configured to display computer game graphics for a computer implemented game, and a user interface, the computer implemented game having one or more levels, the method being performed by executing computer code on the a least one processor to perform the steps of: determining by at least one processor of a computer device, a number of booster options that have been activated in a computer implemented game, a booster option being usable in the computer implemented game to provide a respective additional effect; determining by the at least one processor, if the determined number of booster options is greater than a threshold number; when the determined number of booster options is greater than the threshold number, determining by the at least one processor that a further booster option is to be provided in the computer implemented game.

The further booster option may be different from the activated booster options.

The method may comprise determining by the at least one processor, a value of the at least one further booster option in dependence on the determined number of booster options.

The further booster option may comprise providing a defined time period in the computer implemented game during which a user is permitted to make as many game moves as the user is able to make in that defined time period.

A maximum number of available moves may be associated with the computer implemented game, the maximum number of available moves being in addition to the game moves that the user is permitted to make in the defined time period.

The defined time period may be dependent on the determined number of boosters.

The computer method may comprise: causing, by the at least one processor, a display of the computer device to display one or more user selectable options, a user selectable option being associated with a respective booster option; determining, by the at least one processor, in response to user input received via a ser interface of the computer device when a respective user selectable option has been selected; and determining, by the at least one processor, that the respective booster option associated with the respective user selectable option has been activated.

The method may comprise determining, by the at least one processor, in response to one or more game criteria being satisfied, that a respective booster option is activated.

The method may comprise determining, by the at least one processor, in response to a purchase, that a respective booster option is activated.

The method may comprise deploying, by the at least one processor, the further booster option in the computer implemented game in response to user input received via a user interface of the computer device, the user input allowing a user to control when the further booster option is deployed in the computer implemented game.

The method may comprise causing, by the at least one processor, a display of the computer device to display a game board for the computer implemented game and to display a user selectable option for the further booster option, and in response to user input received via a user interface of the computer device selecting the user selectable option for the further booster option causing the further booster option to be deployed in the computer implemented game.

The method may comprise controlling, by the at least one processor, a display of the computer device to display a user selectable play option and causing, by the at least one processor, a game board for the computer implemented game to be displayed on a display of the computer device in response to user input selecting the user selectable play option.

The method may comprise controlling, by the at least one processor, a display of the computer device to display a plurality of different user selectable level options for the computer implemented game and in response to user input selecting one of the user selectable level options, causing an associated level of the computer implemented game to be provided.

The method may comprise controlling, by the at least one processor, the display of the computer device to display a pre-level screen after a respective user selectable level option has been selected, the pre-level screen configured to display information associated with at least one of the booster options.

According to another aspect, there is provided a non-transitory computer readable medium encoded with instructions for controlling a computing device comprising at least one processor, at least one memory, a display configured to display computer game graphics for a computer implemented game, the computer implemented game having one or more levels, and in which the instructions are executed on the at least one processor to perform the steps of: determining by at least one processor, a number of booster options that have been activated in the computer implemented game, a booster option being usable in the computer implemented game to provide a respective additional effect; determining by the at least one processor, if the determined number of booster options is greater than a threshold number; when the determined number of booster options is greater than the threshold number, determining by the at least one processor that a further booster option is to be provided in the computer implemented game.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments of the invention will now be described by way of the accompanying drawings in which:

FIG. 12a shows a first method of some embodiments;

FIG. 12b shows a second method of some embodiments;

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations.

Figure 1:
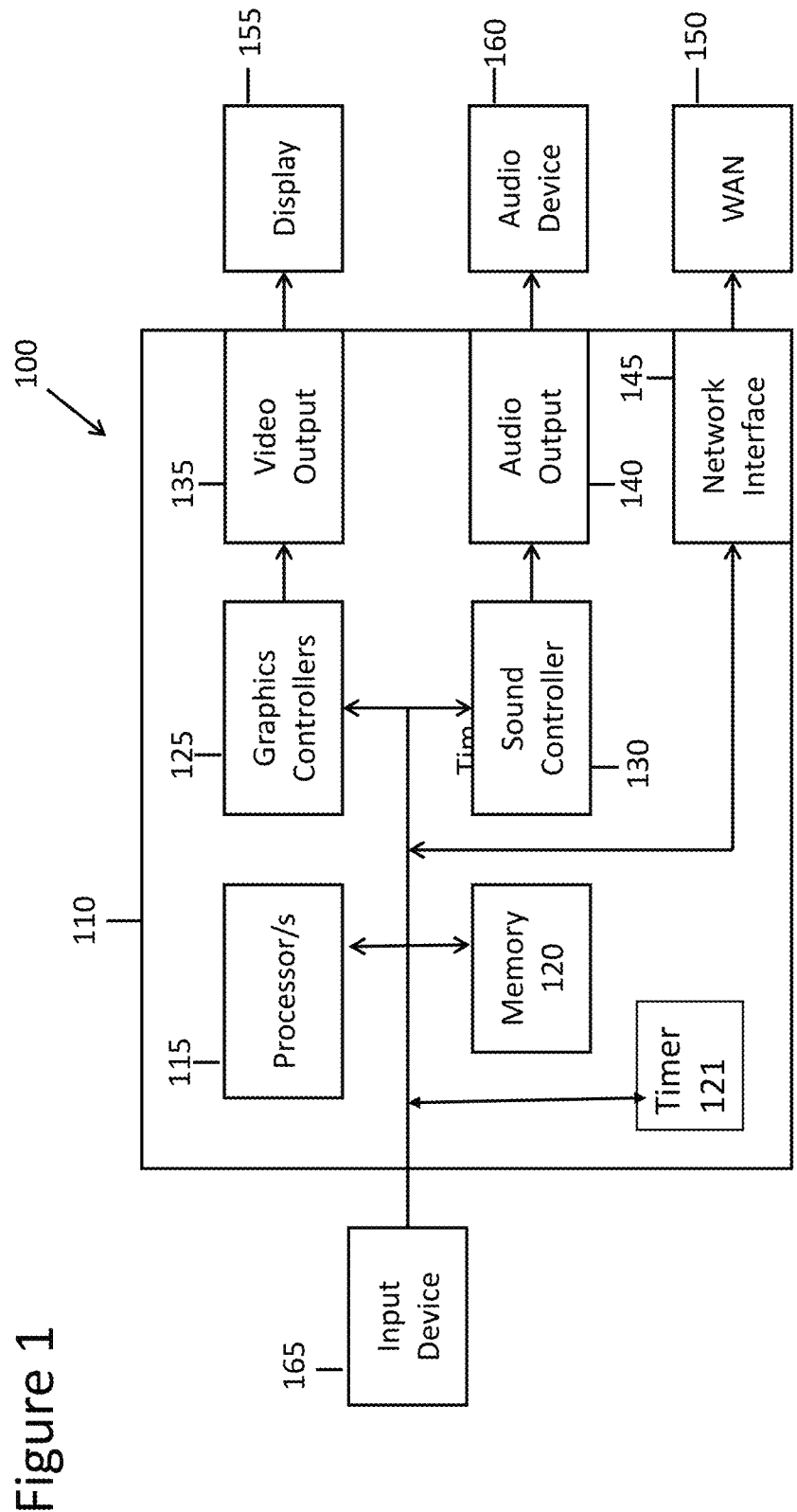
FIG. 1 shows an example user device in which some embodiments may be provided.

A schematic view of a user device 100 according to an embodiment is shown in FIG. 1. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example. The blocks of the controller 110 are configured to communicate with each other by an interconnect such as a bus or any other suitable interconnect and/or by point to point communication.

A timer 121 may be provided. The timer may be a hardware timer or a software timer or implemented by a combination of hardware and software. The timer may be a count up and/or a count down timer. The timer may be controlled by at least one processor. The timer may be at least partially implemented by at least one processor.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
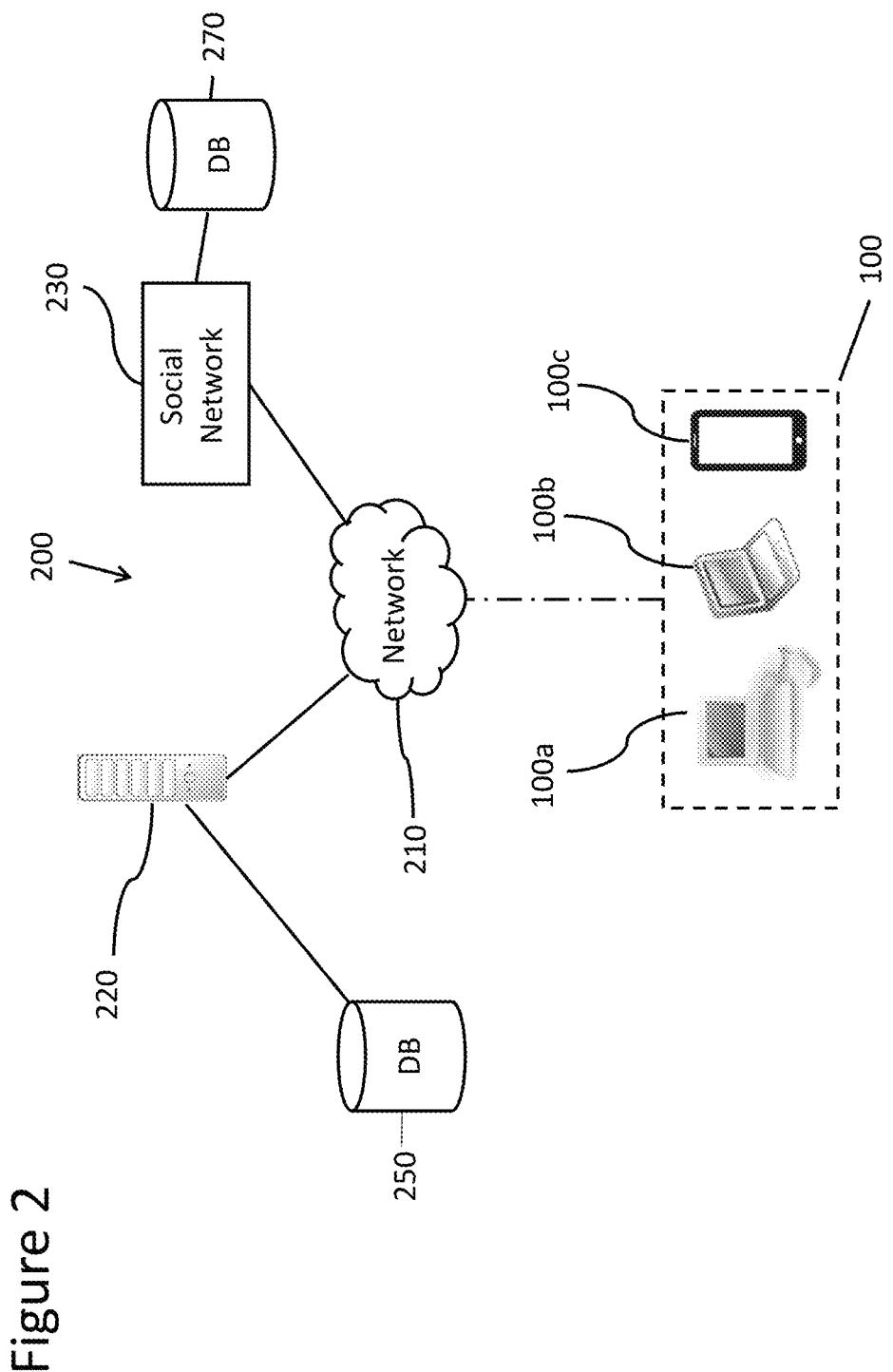
FIG. 2 shows an example system in which some embodiments may be provided.

FIG. 2 schematically shows a system 200 according to an embodiment. The system 200 comprises a server 220 which may store or be in communication with a database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

The server 220 may communicate via, for instance, the internet 210 to one or more client or user devices 100, such as the user device 100 shown in FIG. 1 by way of example, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 3:
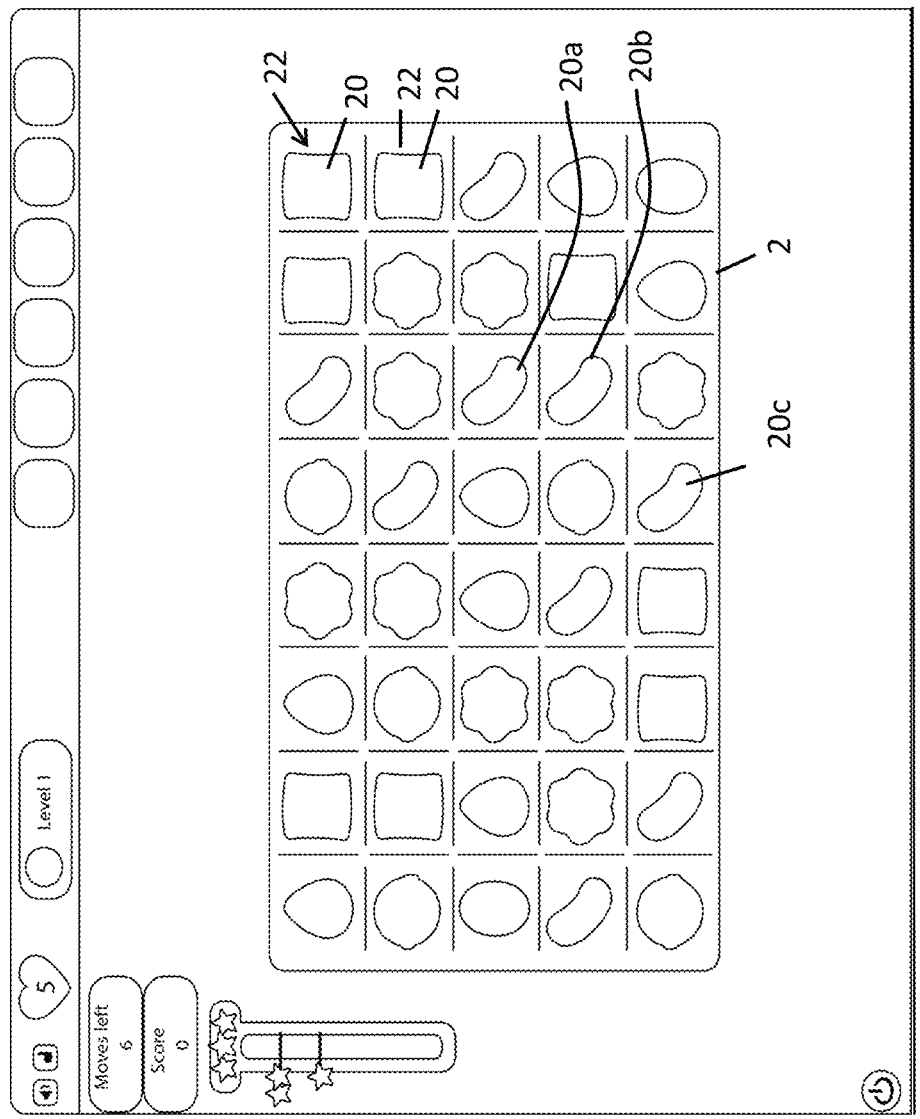
FIG. 3 is a schematic diagram of a game board of a match three game illustrating a basic example of a match three game.

FIG. 3 shows a display of a match 3 switcher game called Candy Crush Saga™ FIG. 3 illustrates a game board 2 with a plurality of game elements 20. The game elements are each of six different shapes and colours. Of course, in other embodiments, there may be more or less than six different game elements. Each game element type may be defined by one or more of particular characteristics, for example a particular shape and colour combination. Each game element is supported by a tile 22.

Figure 4:
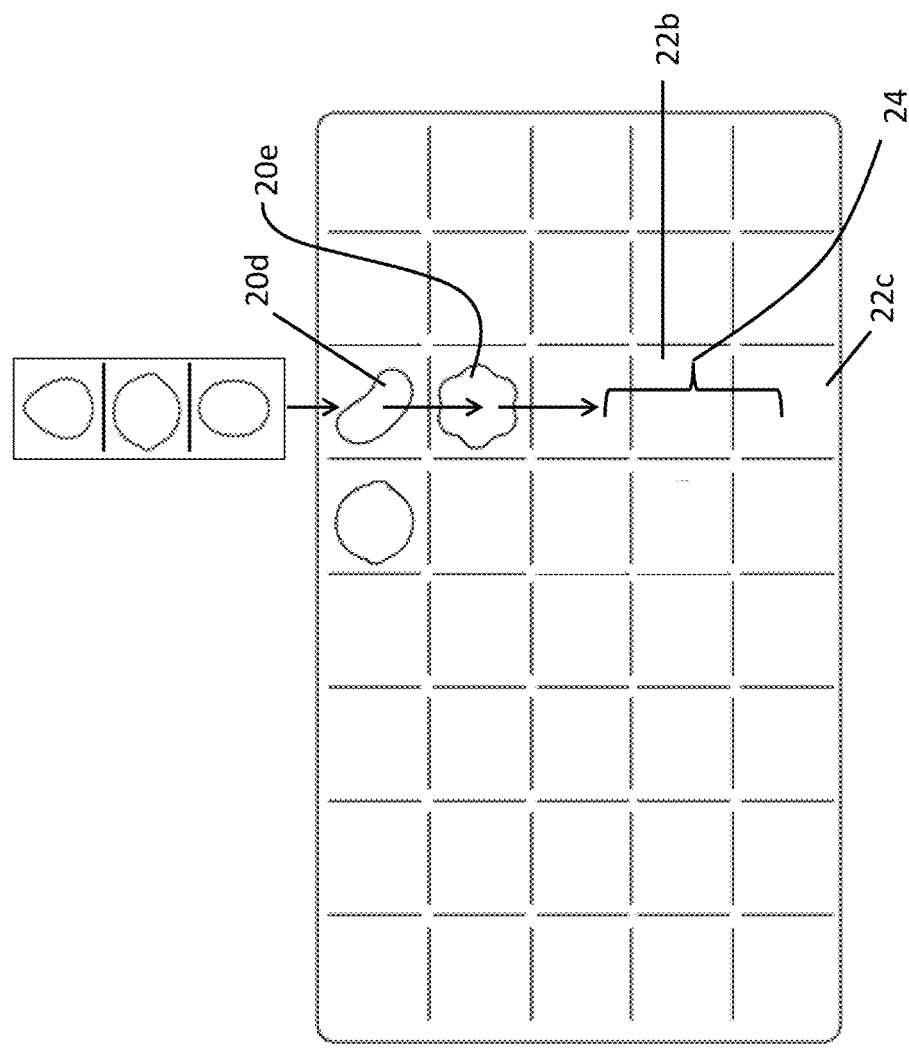
FIG. 4 is a schematic diagram illustrating how a game board is populated with replacement game elements.

In the known version of the match 3 switcher game, the aim of the game is to swap game elements in the shape of candies with each other to make moves on the game board. To gain points the player has to make moves that create matches of at least three of the same game element or candy. In doing so, the player gains points and the matched game elements are removed. As a result, new game elements fall into place from the top of the game board in order to fill any spaces created. Assume in FIG. 3 that game element 20c is moved one place to the right to form a three-line match with game elements 20a and 20b. Turning now to FIG. 4, this has the effect of game elements 20a, 20b and 20c being removed or "disappearing" from the game board, creating a visual effect (animation) on the screen to indicate the disappearance, such as a minimal explosion effect. The two game elements which were directly above game elements 20a will now fall downwards into the spaces created by the removal of game elements 20a, 20b and 20c. Thus, game element 20e will end
up at the location 22c, and game element 20d will end up at the location 22b. In addition, three new game elements are provided and fall downwards into the game board to fill the remaining three spaces above location 22b. The new game elements may be generated at random. The user then has a new game board on which to play a subsequent move.

Game elements may drop down from above the game board at a set speeds and from the top of the game board. In an alternative version the physics can vary so that the speed and direction of replacement game elements can alter.

As will be described, embodiments may be used with a switcher game, such as discussed in relation to FIGS. 3 and 4 or any other suitable switcher game. Other embodiments may be used with any other suitable games such as but not limited to linker games, clicker games and shooter games. The previously described games are by way of example only.

It should be appreciated that embodiments may be applied to any other suitable type of matching game of the matching genre.

Some embodiments may be applied to computer implemented games which have one or more levels. In some games, a user may be required to complete a certain level before the user is able to progress to a next level. In some games, the user may be able to go back and play any previous level. A game may have a number of different levels. Different levels may have different requirements to be met.

Figure 5:
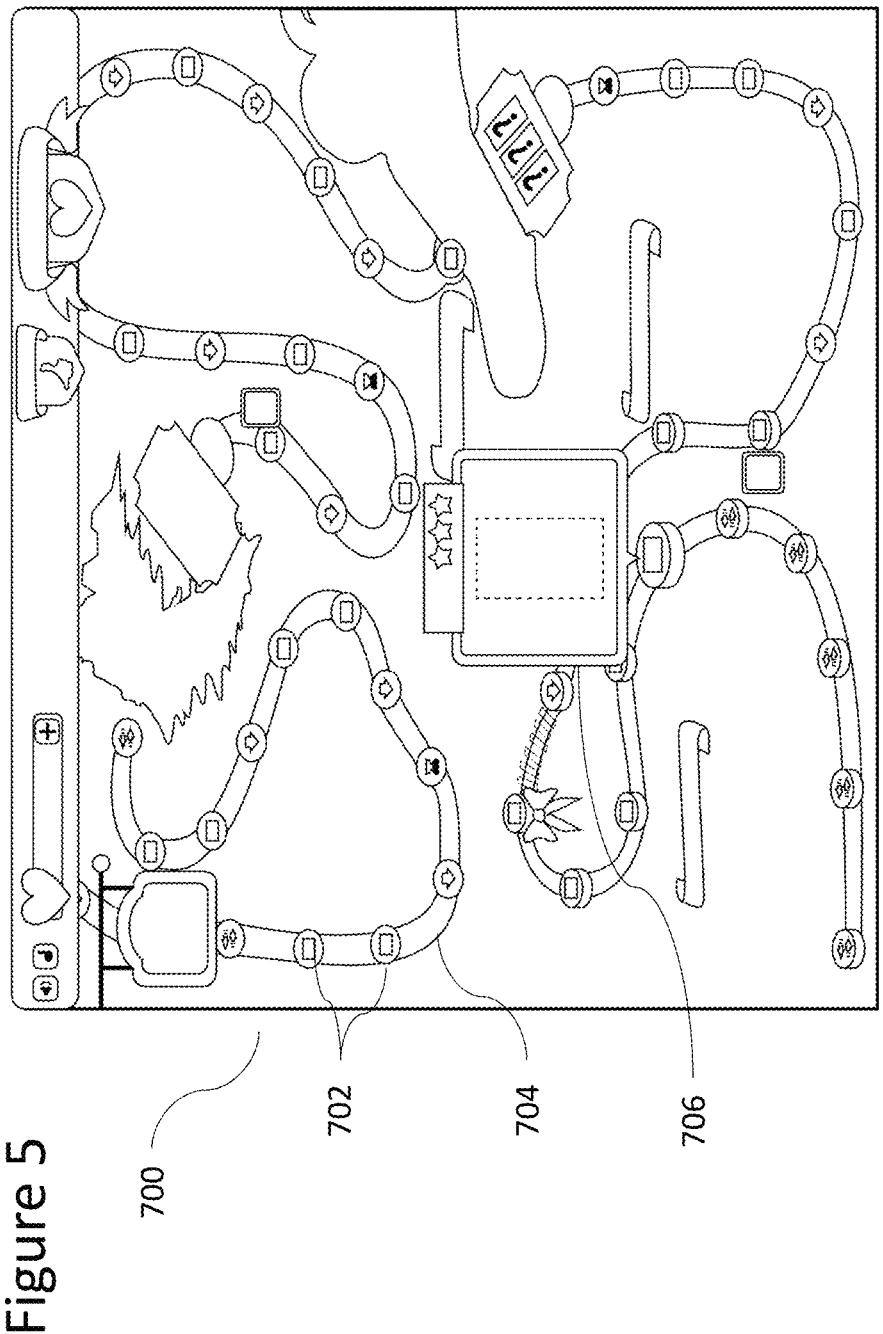
FIG. 5 schematically shows a representation of different levels of a game.

In some computer implemented games, the different levels may be represented on a map 700. FIG. 5 schematically shows one example of such a view. Different levels 702 are represented on a path 704 so that the user can see the progress which he has made playing the game. The different levels may be displayed in a first manner and/or with first information if the level has not been completed and in a second manner and/or with second information if the level has been completed.

In some computer implemented games, if the player has connected to a social network, then friends' progress from the same network may be viewed on the map by the means of information provided next to the highest level they have currently reached or by virtual of a league table which can be displayed.

In the map view, the player can hover over a level to display a thumbnail 706 of it. This makes it easier to find specific already completed levels and can also give the player an idea of what to expect before actually starting a level.

Figure 6:
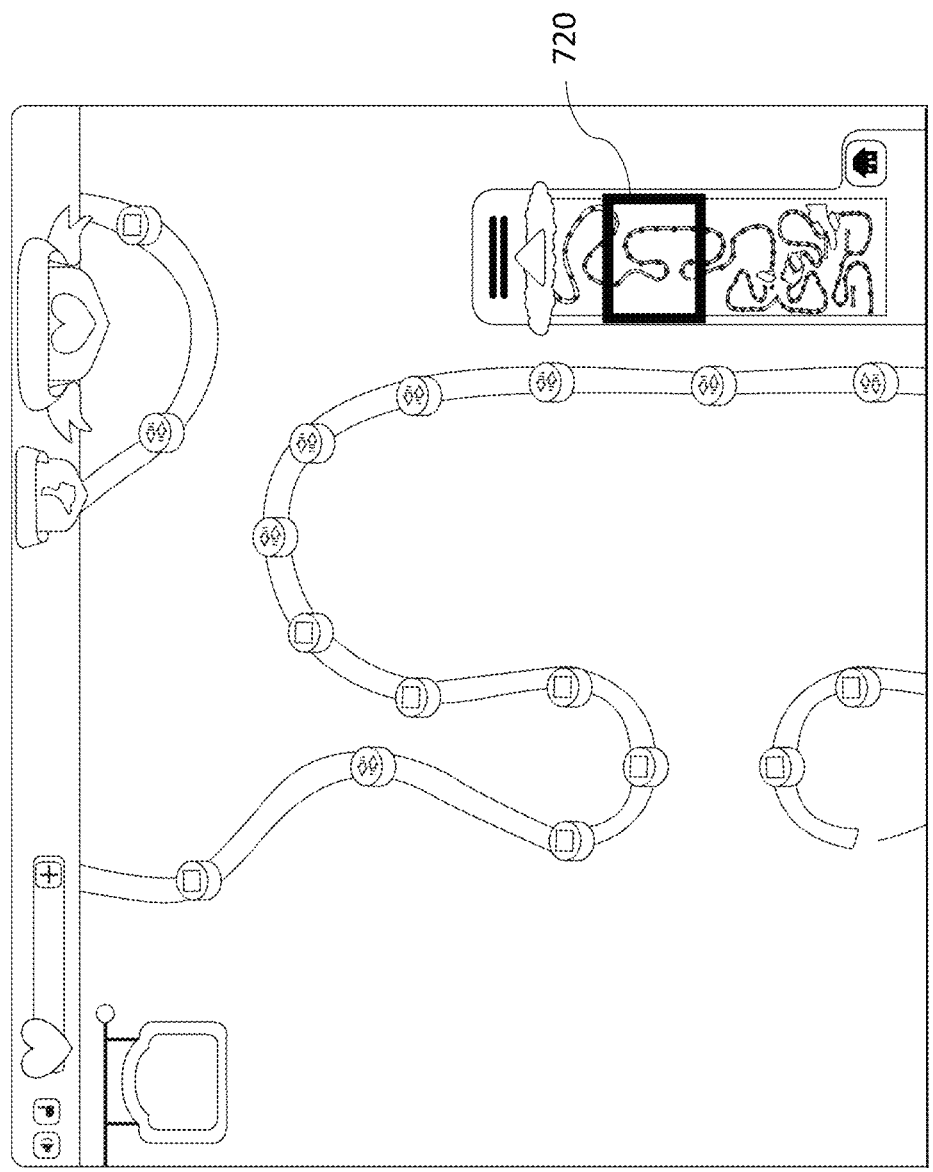
FIG. 6 schematically shows a zoomed representation of some of the different levels of the game.

When navigating on a map in a game, it may sometimes be difficult to find desired level or area of the map if the map is, for example, too large relative to the available display. In some embodiments, a smaller version 720 of the map is displayed as shown in FIG. 6. The user is able to select a part of that map to be displayed on the display such that the part of the map displayed is larger than when the entire map is displayed. The smaller version of the map will highlight the part of the map which is being displayed in enlarged from.

As the player travels through the levels in the game, his progress may be represented as a journey along a path in the virtual map.

It should be appreciated that the map representation is only one way in which progress in a game may be shown. In other computer implemented games, for example, a list of levels may be provided with an indication of how far in the list the player has progressed.

In some computer implemented games, a plurality of different of different levels with different game modes may be provided. A given game mode may be associated with different game play rules and/or objectives.

In some computer implemented games, there may only be a single game mode.

In some computer implemented games, a given game mode may be associated with one or more different levels.

Some embodiments which provide a further booster effect in a computer implemented game will now be described.

Figure 7:
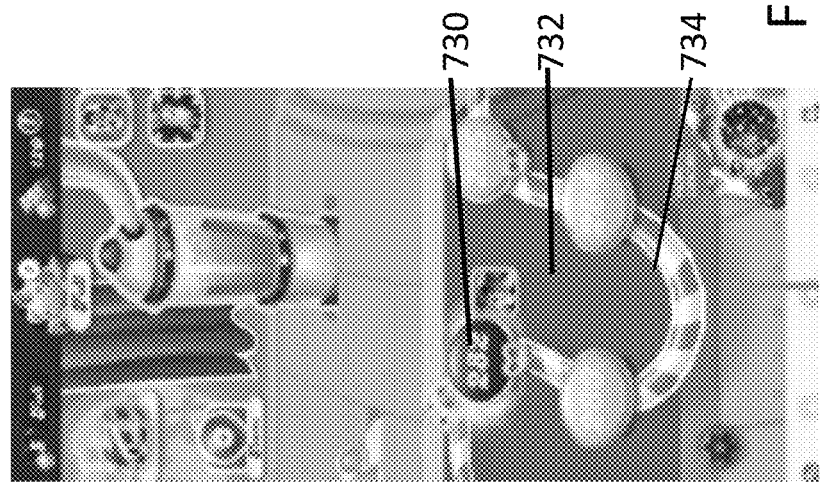
FIG. 7 shows one example of a screen displayed with representations of a plurality of levels.

Reference is made to FIG. 7 which shows a first example screen displayed on the display. In this FIG. 7, a part 732 of a game level map 734 is shown. The player has reached the level referenced 730. In this example, the user provides user input via the user interface to select the level referenced 730.

Figure 8C:
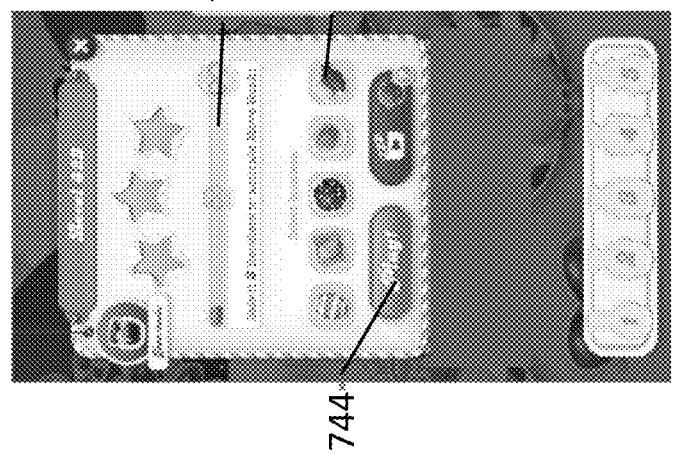
FIGS. 8a to 8c show pre-level screens of some embodiments.
Figure 8B:
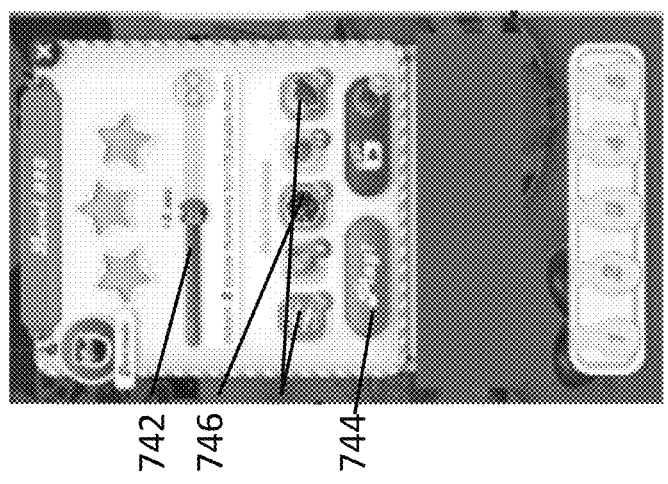
Figure 8A:
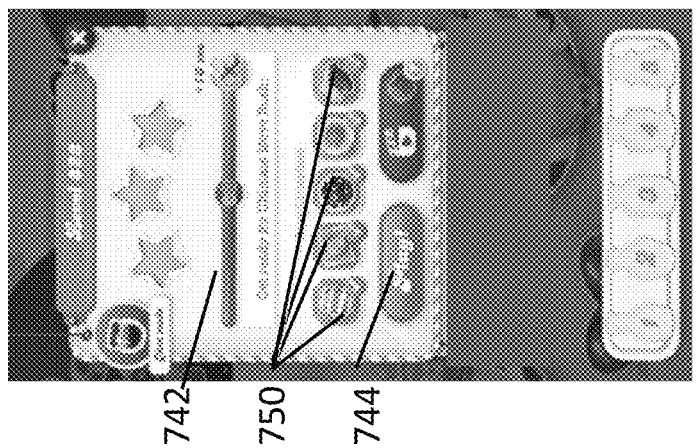

In response to that user input, the at least one processor may be configured to cause a second example screen such as shown in one of FIGS. 8a to c to be displayed.

In FIG. 8a, a row of possibly activatable game boosters 740 are shown. In this example screen, none of the possibly activatable game boosters are activated.

When a game booster is activated, the game booster will be available when the user plays the game. For example, one or more activated game boosters will be provided on the game board. This may be at the beginning of the playing of the level and/or during the playing of the game.

Alternatively or additionally, a game booster will be available for selection by a player during the playing of the game.

A game booster is configured to provide an additional effect when triggered. A game booster may cause one or more other game elements to be removed and/or to change one or more other game elements to another game element and/or cause one or more objects to be removed from the game board and/or cause one or more objects to change. The one more objects may be associated with a game element or not associated with a game element. In some embodiments, where one or more objects are associated with a game element, the removal of one or more game objects may allow an associated game element to be used in game play. Alternatively or additionally, an object may be a tile background or the like which may be changed when one or more game booster is triggered.

In some embodiments, the row may comprise five possibly activatable game boosters. In other embodiments, the row may comprise more or less than five possibly activatable game boosters.

In some embodiments, the possibly activatable game boosters are arranged in a row. However, it should be appreciated that this is by way of example only and the possibly activatable game boosters may be displayed in any suitable manner.

In some embodiments, the possible activatable game boosters may be arranged in a scrollable list.

In some embodiments, not all the possibly activatable game boosters may not be displayed at the same time on the screen. For example, in some embodiments a subset of one or more but not all of the possible activatable game boosters may be display at the same time.

It should be appreciated that a game booster may be activated by a user selecting a game booster. By way of example only, the user may provide user input via the user interface which selects a game booster to thereby activate that game booster.

Alternatively or additionally, the at least one processor may activate one or more of the possible activatable game boosters. This may be in response to one or more criteria being satisfied. The one or more criteria may comprise one or more different game play criteria. The one or more game play criteria may comprise the player satisfying one or more game related goals. The one or more game related goals may comprise the player completing a particular level and/or completing n (where n is an integer) consecutive levels on a first attempt and/or the player has been playing the game for a given amount of time and/or any other suitable game related goal.

Alternatively or additionally, a criteria for the at least one processor activating a booster may be a random or pseudo random criteria.

Alternatively or additionally, a criteria for at least one processor activating a booster may be a game promotion.

In some embodiments, one or more game boosters may be activated by being purchased, for example using in game currency.

In some embodiments, one or more further booster options is provided in the game when a minimum number of boosters is activated.

In some embodiments, one or more further booster options is provided when at least three boosters are activated. However, in other embodiments, one or more further booster options may be provided when more or less than three boosters are activated.

In some embodiments, the extent of the effect provided by the further booster option may be dependent on the number of boosters activated and/or which one of the boosters is activated.

In some embodiments, different further booster options will be provided in dependence on the number the number of boosters activated.

In some embodiments, the one or more further booster option will depend on a game level currently being played.

In some embodiment, the further booster option will be different from the possible activatable game boosters.

In the embodiments described in relation to FIGS. 8a to 8c, the further booster option comprises a move rush booster. When this booster is deployed, the player will have an unlimited number of moves in a limited time period. This may be used with games which have a limited number of moves available to complete one or more different game objectives. In some embodiments, the period of time may be dependent on the number of boosters activated. In some embodiments, a minimum number of boosters may need to be activated in order for this further booster option to be available. In some embodiments the minimum number of boosters may be one or more. In the examples shown in FIGS. 8a to 8c, this minimum number of boosters may be 3.

In some embodiments, the screen may be configured to display an indication 742 as to whether or not this further booster option is available yet. In some embodiments, the indication may comprise information as to what is required to cause the further booster option to be available. In the example of FIG. 8a where none of the possibly activatable game boosters have been activated, a message indicates to the user the minimum number of boosters which need to be activated in order to provide the move rush booster. In this example, the message indicates to the user that three boosters need to be activated.

The screen shown in FIG. 8a also comprises a user selectable area 744 which when selected by the user will allow the user to play the selected level. In the example shown in FIG. 8a, the move rush booster will not be available when playing the selected level.

In FIG. 8b, three 746 of the possibly activatable game boosters have been activated. In some embodiments, an activated game booster is displayed in a visual distinct manner from one which is not yet activated. In the example shown in FIG. 8b, an activated game booster is displayed with a tick. This is by way of example only and different representations may be used to indicate an activated game booster as compared to a game booster which is not activated for the game.

In some embodiments a possibly activatable game booster may be activated or not yet activated (but available for activation). Alternatively or additionally, one or more game boosters may not yet be available for activation. These one or more game boosters may made available for activation through game play or by purchase using in game currency or in any other suitable manner. Where one or more game boosters are not yet be available for activation, these may be displayed in a visual distinct manner (for example greyed out or the like) as compared to an available possibly activatable game booster.

In the screen shown in FIG. 8b, the indication 742 now indicates that the move rush booster option is available as there are now the minimum number of activated boosters. The indication may indicate what is required to have the maximum effect of the move rush booster option. In this example, a message is displayed to the user indicating that the user needs to select two more boosters in order for the maximum effect.

The screen shown in FIG. 8b also comprises the user selectable area 744 which when selected by the user will allow the user to play the selected level. In the example shown in FIG. 8b, the move rush booster will be available when playing the selected level, but at its minimum level.

In FIG. 8c, five 746 of the possibly activatable game boosters have been activated.

In the screen shown in FIG. 8c, the indication 742 now indicates that the maximum move rush booster option is available as there are now the maximum number of activated boosters.

The screen shown in FIG. 8c also comprises the user selectable area 744 which when selected by the user will allow the user to play the selected level. In the example shown in FIG. 8c, the move rush booster will be available when playing the selected level, but at its maximum effect level.

It should be appreciated that the screen in FIG. 8a may be initially displayed with one or more of screens FIGS. 8b and/or c displayed subsequently depending on the number of boosters activated.

In some embodiments, the initial screen displayed may already have one or more boosters activated. This may the case where one or more of the boosters are activated by the at least one processor.

Figure 9:
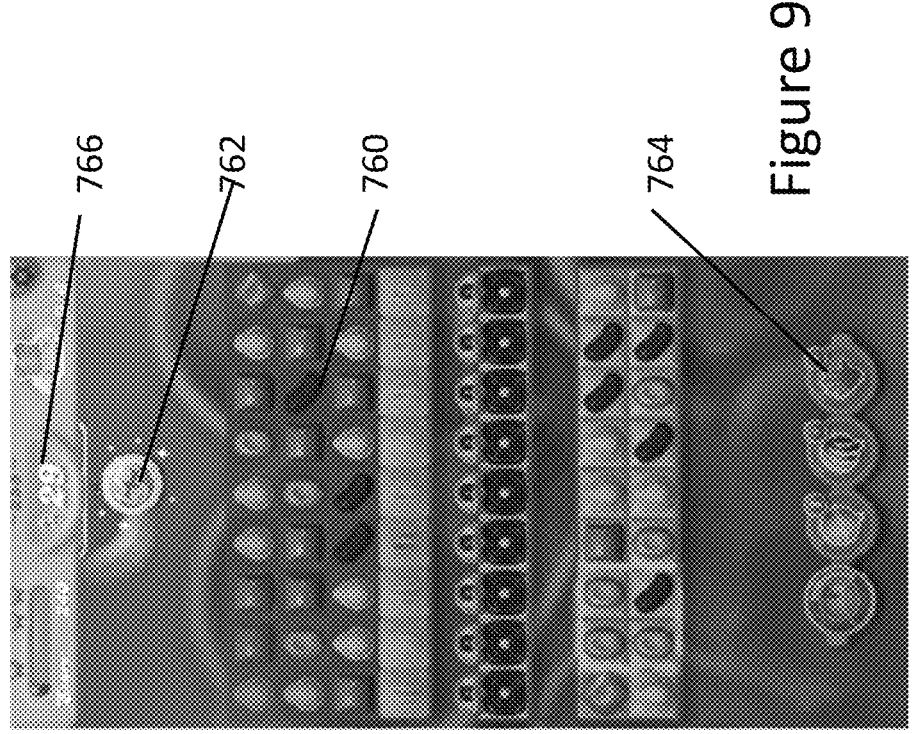
FIG. 9 shows a screen of a game board showing an available further booster option.

Reference is made to FIG. 9 which shows an example a screen which may be displayed when at the play option is selected when the further booster option is available. As can be seen the screen comprises a game board 760. In this example, the game board has user selectable game elements which may be moved to make one or mores such as previously discussed. The screen has an indication 766 as to a number of moves remaining. Optionally the screen displays one or more game booster 764 options which can be deployed during the game in response to user input. These may comprise one or more of the activated boosters discussed in relation to FIGS. 8a to c and/or may comprise one or more different boosters.

The screen also has a user selectable area 762 which is associated with the further booster option. This optionally may visually indicate if the further booster is providing a minimum effect, a maximum effect or something in between. The user is able to control when during the game the further booster option is to be deployed.

Figure 10:
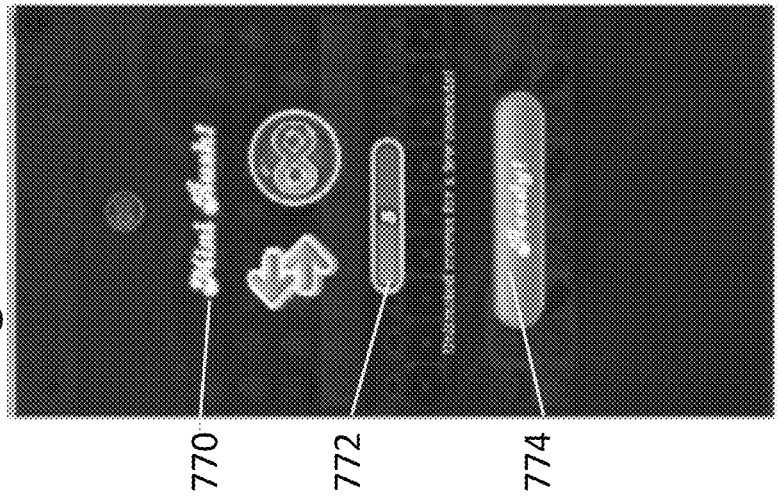
FIG. 10 shows a screen displayed when the further booster option is selected.

Reference is made to FIG. 10 which shows an example screen which is displayed when user input is received which selects the further booster option to be deployed in the game. This is an optional screen in some embodiments. The screen may provide information 770 about the effect being provided by the further booster. For example the screen may provide information about whether the booster is providing the minimum effect, a maximum effect or something in between. In some embodiments, the different effects may comprise different lengths of time. In some embodiments, the different effects may have different names as "mini rush", "move rush" and "ultimate rush". This is of course by way of example only. Alternatively or additionally information 772 may be provided as to the length of time for which the unlimited number of moves is available.

The screen may comprise a user selectable area 774 which when selected by the user will start the time during which the user is able to make as many moves as he is able.

Figure 11:
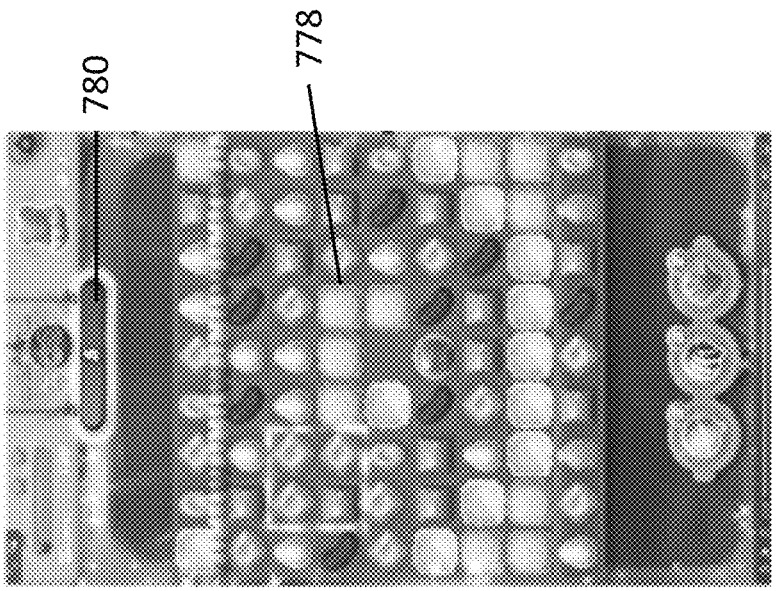
FIG. 11 shows a screen of a game board when the further booster option is selected.

FIG. 11 shows a screen which is displayed. This may be for example displayed when the user selectable area 774 of FIG. 10 is selected by the user. This will show the game board 778. In some embodiments, this may be the same game board which is displayed immediately before the user selects the further booster option. The screen may show the remaining number of seconds or other similar indication 780 for which the unlimited number of moves remains available. The visual appearance of the game board may be altered to indicate to the user that the further booster option has been deployed and active.

Reference is made to FIG. 12a which shows a first method of some embodiments.

In step S1, the at least one processor is configured to determine that user has selected a game level. This user will have provided user input via the user interface in order to select the level. This may be to select for example the level referenced 730 in FIG. 7. However, in other embodiments, the level may be selected in any other suitable way.

In step S2, the at least one processor is configured to cause a pre-level screen to be displayed. Optionally one or more of the following may be displayed on the pre-level screen: an indication as to the number of activated boosters (if any), an indication if the further booster effect is provided and an indication of the associated value.

Depending on the number of activated boosters, this may be example as shown in FIG. 8a, 8b or 8c.

In step S3, the at least one processor is configured to determine that user input has been received via the user interface.

The at least one processor is configured to determine if the user is selecting one or more boosters or has selected an option to play the level.

In the event that the user has selected the option to play the game, the next step is step S6. In step S6, one or more screens are provided to allow the user to play the game. By way of example only, these screens may be as shown in FIGS. 10 and 11.

If it is determined in step S3, that the user has selected and/or purchased one or more boosters, then the next step is step S4.

In step S4, the at least one processor is configured to determine an updated number of boosters which have been activated. The at least one processor may be configured to determine the type of boosters activated. The at least one processor may be configured to determine if one or more criteria for providing the further booster effect has been satisfied (if this criteria has not previously been satisfied).

The at least one processor is configured to determine or update the value associated with further booster effect.

In step S5, the at least one processor is configured to cause the display to display an updated pre-level screen.

Step S5 is then followed by step S3.

Reference is made to FIG. 12b which shows a second method of some embodiments.

In step B1, the at least one processor is configured to determine that user has selected a game level. This user will have provided user input via the user interface in order to select the level. This may be to select for example the level referenced 730 in FIG. 7. However, in other embodiments, the level may be selected in any other suitable way.

In step B2, the at least one processor is configured to determine the number of activated boosters. This step may be where the at least one processor activates one or more boosters for example in response to the satisfying one or more game criteria.

In step B3, the at least one processor is configured to determine if the criteria for a further booster effect is satisfied. For example, in some embodiments, this may be to determine if three or more boosters have been activated.

The further booster effect may be different from the individual and/or combined effects of the activated boosters.

This step may be optional in some embodiments.

Optionally, the at least one processor may be configured to determine a value associated with the booster effect. In some embodiments, this may be only determined when the criteria for the further booster effect is satisfied. In some embodiments, this value may not be determined at this step. In some embodiments, the value may be determined even if the criteria for the further booster effect is not satisfied. For example, where the criteria for the further booster effect is not provided, the value may be zero or the like.

In some embodiments, the value may be a time value or a value indicative of the length of time for which the further booster effect is provided.

The value may be dependent on the number of boosters activated.

In some embodiments, the at least one processor may determine the value by using a look up table or the like to obtain the value associated with the determined number of activated boosters.

In step B4, the at least one processor is configured to cause the display to display an indication as to the number of activated boosters (if any).

Alternatively or additionally, the at least one processor may be configured to cause the display to display an indication as to if the further booster effect is provided.

Alternatively or additionally, the at least one processor may be configured to cause the display to display an indication of the associated value.

One or more of the indication as to the number of activated boosters, an indication as to if the further booster effect is provided and an indication of the associated value may be omitted from the displayed image.

In step B4, the at least one processor is configured to cause the display to display a pre-level screen with one or more of the indication as to the number of activated boosters, an indication as to if the further booster effect is provided and an indication of the associated value.

Depending on the number of activated boosters, this may be example as shown in FIG. 8a, 8b or 8c.

In step B5, the at least one processor is configured to determine that user input has been received via the user interface.

The at least one processor is configured to determine if the user is selecting one or more boosters or has selected an option to play the level.

In the event that the user has selected the option to play the game, the next step is step B8. In step B8, one or more screens are provided to allow the user to play the game. By way of example only, these screens may be as shown in FIGS. 10 and 11.

If it is determined in step B5, that the user has selected and/or purchased one or more boosters, then the next step is step B6.

In step B6, the at least one processor is configured to determine an updated number of boosters which have been activated. The at least one processor may be configured to determine the type of boosters activated.

In step B7, the at least one processor is configured to determine if one or more criteria has been satisfied (if this criteria has not previously been satisfied) for providing one or more further booster effects. Alternatively or additionally, the at least one processor may be configured to determine or update the value associated with further booster effect.

Step B7 is then followed by step B4

Figure 13:
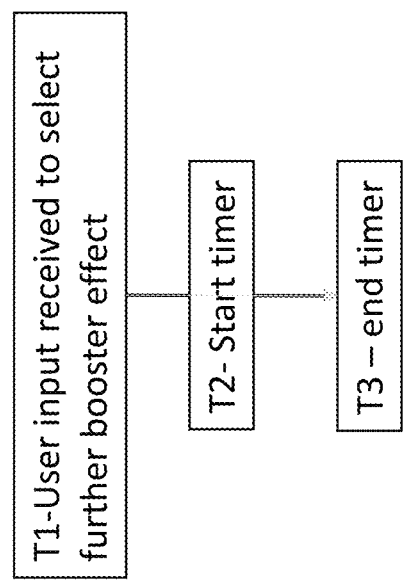
FIG. 13 shows a second method of some embodiments.

Reference is made to FIG. 13 which shows another method of some embodiments.

In step T1, user input is received via the user interface to deploy or use the further booster effect. This may be while a game board is displayed.

In step T2, the at least one processor is configured to start a timer.

In step T3, the at least one processor is configured to end the timer. In the period between the starting and ending of the timer, the user is able to make as many moves as they can within that period. This will not change the number of moves which are available to the user at the point at which the further booster effect was deployed or used.

Figure 14:
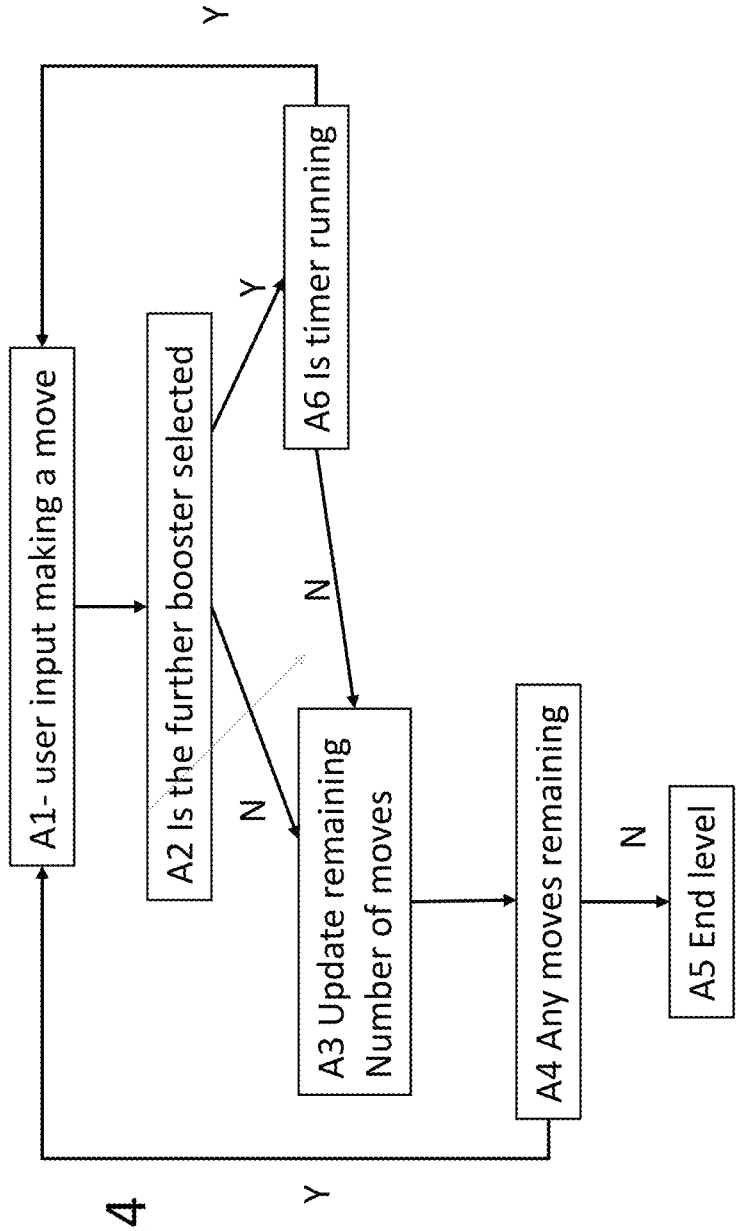
FIG. 14 shows a third method of some embodiments.

Reference is made to FIG. 14 which shows a method of some embodiments.

In step A1, the user interface is configured to receive user input which the at least one processor determines to be the making of a move.

In step A2, the at least one processor is configured to determine if the further booster has been deployed.

If not, the next step is step A3. In step A3, the at least one processor is configured to update the remaining number of moves. This may be reducing the number of remaining moves by one.

In step A4, the at least one processor is configured to determine if there are any remaining moves after the update. If so, the next step is A1. If not, the next step is step A5 where the level is ended.

If in step A2, is determined that the further booster has been deployed, then the next step is step A6 in which the at least one processor is configured to determine if the timer is still running. If so, the next step is step A1. If not, the next step is step A3.

Some example embodiments may provide methods for introducing complexity into computer implemented games. This may be particularly challenging when considering small screen devices, where complex game arrangements may be difficult to display due to the limitations imposed by the devices in terms of processing capability and display size. By providing any of the abovementioned methods, some example embodiments may allow strategic diversity in gameplay, and therefore introduce a further level of complexity to the computer implemented game, without placing undue burden on processing or display requirements. As such, some embodiments may also drive user engagement with the computer implemented game by making the game more complex and challenging.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device configured to provide a computer implemented game, the computer device comprising:
   a display:
   a user interface configured to receive user input from a player of the computer implemented game; and
   at least one processor,
   the at least one processor being configured to, prior to receiving first user input to start playing a level of the computer implemented game:
      determine a number of different booster options that have been activated, a booster option being usable in the computer implemented game to provide a respective additional effect;
      determining if the determined number of different booster options is greater than a threshold number; and
      when the determined number of different booster options is greater than the threshold number, determining that a further booster option is to be provided in the computer implemented game, the further booster option when deployed in the computer implemented game comprises providing a defined time period in the computer implemented game during which a user is permitted to make as many game moves as the user is able to make in that defined time period without reducing an associated number of available moves,
   the at least one processor being configured to receive the first user input from the user via the user interface and in response to start the computer implemented game and provide an associated initial number of available moves for the computer implemented game; and
   the at least one processor being configured to receive a second user input from the user via the user interface making a move in the computer implemented game, wherein when the further booster option is deployed and active in the computer implemented game, the number of available moves is unchanged by the move and when the further booster option is not deployed in the computer implemented game, the number of available moves is reduced by the move.

2. The computer device as claimed in claim 1, wherein the further booster option is different from the activated booster options.

3. The computer device as claimed in claim 1, wherein the at least one processor is configured to determine a value of the at least one further booster option in dependence on the determined number of booster options.

4. The computer device as claimed in claim 1, wherein the defined time period is dependent on the determined number of boosters.

5. The computer device as claimed in claim 1, wherein the at least one processor is configured to cause the display to display one or more user selectable options, a user selectable option being associated with a respective booster option, determine in response to user input received via the user interface when a respective user selectable option has been selected and determine that the respective booster option associated with the respective user selectable option has been activated.

6. The computer device as claimed in claim 1, wherein the at least one processor is configured, in response to one or more game criteria being satisfied, to determine that a respective booster option is activated.

7. The computer device as claimed in claim 1, wherein the at least one processor is configured to deploy the further booster option in the computer implemented game in response to user input received via the user interface, the user input allowing a user to control when the further booster option is deployed in the computer implemented game.

8. The computer device as claimed in claim 1, wherein the at least one processor is configured to cause the display to display a game board for the computer implemented game and to display a user selectable option for the further booster option, and in response to user input selecting the user selectable option for the further booster option causing the further booster option to be deployed in the computer implemented game.

9. The computer game as claimed in claim 1, wherein the at least one processor is configured to cause the display a user selectable play option, the at least one processor configured to cause a game board for the computer implemented game to be displayed in response to the first user input selecting the user selectable play option.

10. The computer game as claimed in claim 1, wherein the at least one processor is configured to control the display to display a plurality of different user selectable level options for the computer implemented game and in response to user input selecting one of the user selectable level options, cause an associated level of the computer implemented game to be provided.

11. The computer game as claimed in claim 10, wherein the at least one processor is configured to cause the display to display a pre-level screen after a respective user selectable level option has been selected, the pre-level screen configured to display information associated with at least one of the booster options.

12. A computer implemented method, the method being performed in a computing device comprising at least one processor, at least one memory, a display configured to display computer game graphics for a computer implemented game, and a user interface, the computer implemented game having one or more levels, the method being performed by executing computer code on the at least one processor to perform the steps of:

determining by at least one processor, prior to receiving first user input to start playing a level of the computer implemented game:

a number of different booster options that have been activated in a computer implemented game, a booster option being usable in the computer implemented game to provide a respective additional effect;

if the determined number of different booster options is greater than a threshold number; and when the determined number of different booster options is greater than the threshold number, determining that a further booster option is to be provided in the computer implemented game, the further booster option when deployed in the computer implemented game comprises providing a defined time period in the computer implemented game during which a user is permitted to make as many game moves as the user is able to make in that defined time period without reducing an associated number of available moves, receiving the first user input from the user via the user interface and in response starting the computer implemented game and providing an associated initial number of available moves for the computer implemented game; and receiving a second user input from the user via the user interface making a move in the computer implemented game, wherein when the further booster option is deployed and active in the computer implemented game, the number of available moves is unchanged by the move and when the further booster option is not deployed in the computer implemented game, the number of available moves is reduced by the move.

13. The computer method as claimed in claim 12, comprising determining by the at least one processor, a value of the at least one further booster option in dependence on the determined number of booster options.

14. The computer method as claimed in claim 12, comprising:

causing, by the at least one processor, the display of the computer device to display one or more user selectable options, a user selectable option being associated with a respective booster option;

determining, by the at least one processor, in response to user input received via the user interface of the computer device when a respective user selectable option has been selected; and determining, by the at least one processor, that the respective booster option associated with the respective user selectable option has been activated.

15. The computer method as claimed in claim 12, comprising deploying, by the at least one processor, the further booster option in the computer implemented game in response to user input received via the user interface of the computer device, the user input allowing a user to control when the further booster option is deployed in the computer implemented game.

16. The computer method as claimed in claim 12, causing, by the at least one processor, a display of the computer device to display a game board for the computer implemented game and to display a user selectable option for the further booster option, and in response to user input received via the user interface of the computer device selecting the user selectable option for the further booster option causing the further booster option to be deployed in the computer implemented game.

17. A non-transitory computer readable medium encoded with instructions for controlling a computing device comprising at least one processor, at least one memory, a display configured to display computer game graphics for a computer implemented game, the computer implemented game having one or more levels, and in which the instructions are executed on the at least one processor to perform the steps of:

determining by at least one processor, prior to receiving first user input to start playing a level of the computer implemented game:

a number of different booster options that have been activated in the computer implemented game, a booster option being usable in the computer implemented game to provide a respective additional effect;

if the determined number of different booster options is greater than a threshold number; and when the determined number of different booster options is greater than the threshold number, determining that a further booster option is to be provided in the computer implemented game, the further booster option when deployed in the computer implemented game comprises providing a defined time period in the computer implemented game during which a user is permitted to make as many game moves as the user is able to make in that defined time period without reducing an associated number of available moves, receiving the first user input from the user via the user interface and in response starting the computer implemented game and providing an associated initial number of available moves for the computer implemented game; and receiving a second user input from the user via the user interface making a move in the computer implemented game, wherein when the further booster option is deployed and active in the computer implemented game, the number of available moves is unchanged by the move and when the further booster option is not deployed in the computer implemented game, the number of available moves is reduced by the move.

\* \* \* \* \*